United States Patent [19]

Collender

[11] 4,323,920

[45] Apr. 6, 1982

[54] STEREOSCOPIC TELEVISION (UNAIDED WITH LIP SYNC) ON STANDARD BANDWIDTH-METHOD AND APPARATUS

[76] Inventor: Robert B. Collender, 709 Patterson Ave., Glendale, Calif. 91203

[21] Appl. No.: 150,982

[22] Filed: May 19, 1980

[51] Int. Cl.³ .............................................. H04N 9/54
[52] U.S. Cl. .................................... 358/88; 358/231; 350/130; 352/58
[58] Field of Search ................... 380/88, 90, 92, 231, 380/236, 3, 2, 144; 352/88; 350/198, 130, 87, 143, 130

[56] References Cited

U.S. PATENT DOCUMENTS

| | | | |
|---|---|---|---|
| 3,292,491 | 12/1966 | Hourdiaus | 353/122 |
| 3,520,589 | 7/1970 | Angel et al. | 350/150 |
| 3,654,499 | 4/1972 | Smith | 307/304 |
| 3,763,480 | 10/1973 | Weiner | 340/173 R |
| 3,824,002 | 7/1974 | Beard | 350/160 LC |
| 3,866,209 | 2/1975 | Weiner | 340/784 |
| 3,976,826 | 8/1976 | Fulton, Jr. | 358/133 |
| 3,982,063 | 9/1976 | Brown et al. | 358/133 |
| 4,006,968 | 2/1977 | Ernstoff | 350/160 R |
| 4,019,807 | 4/1977 | Boswell | 350/160 LC |
| 4,089,597 | 5/1979 | Collender | 352/53 |
| 4,113,367 | 9/1978 | Fritzler | 352/105 |
| 4,227,201 | 10/1980 | Grimberg et al. | 357/27 |
| 4,231,642 | 11/1980 | Collender | 352/58 |

*Primary Examiner*—Robert L. Richardson
*Assistant Examiner*—Edward L. Coles

[57] ABSTRACT

3-D television without glasses having horizontal parallax and operating over standard single channel bandwidth is implemented by using two television cameras aligned in the same plane, a 2:1 bandwidth compression and a receiver that processes the two views one scan line at a time using successive element correlation within common scan lines to synthesize N views in-between the two received views. The television receiver/-projector contains an optical scanner with a central projection lamp, N+2 small full frame Charge Couple Device Liquid Crystal Light Valve (CCDLCLV) television modulation array surfaces and is driven by N+2 views of the scene. N+2 views are sequentially projected by the optical scanner to a semi-specular screen that returns all projected light to a horizontally moving vertical aerial exit slit (having no physical properties) resulting in the accurate reconstruction of continuous scene horizontal parallax for simultaneous view by several observers.

7 Claims, 4 Drawing Figures

STEREOSCOPIC TELEVISION (UNAIDED WITH LIP SYNC) ON STANDARD BANDWIDTH-METHOD AND APPARATUS

CROSS REFERENCES TO RELATED APPLICATIONS

This patent application constitutes an improvement relative to my pending 3-D television (TV) application "Stereoscopic Television (Unaided) on Standard Bandwidth-Method and Apparatus" Ser. No. 107,838 filed 12-28-79 now U.S. Pat. No. 4,290,083, issued 9-15-81. Ser. No. 107,838 required a relative motion between the television camera and the scene so that 24 successive frames in time could serve as source information for horizontal parallax in the 3-D TV receiver/projector. The result prevented accurate lip-sync for viewing from all angles in front of the screen. The loss of lip-sync occured because of an approximately one-half second sound to picture shift at the extreme ends of the scan compared with the middle where sound and picture are in-sync. My new invention circumvents this problem and provides a means to photograph and reproduce any kind of scene as in a standard television broadcast where lip-sync is maintained for all positions. To accomplish this, the studio is equipped with two synchronized television cameras having any given scan line of their image sensors common to a plane. Bandwidth is compressed by any of current and known methods by a factor of 2:1 to allow both pictures to be transmitted over a single television channel's allotted bandwidth. The TV receiver processes the two views and synthesizes N views in-between these two given views on a scan line by scan line basis. The CCDLCLV's are loaded with the simulated N+2 views of the scene photographed where all views occur at the same time and have correct lip-sync.

BRIEF SUMMARY OF THE INVENTION

My invention consists of a new 3-dimensional television system that uses existing single channel television bandwidth and provides "Holographic like" 3-D without the need for observers to wear glasses and provides the facility that allows observers to "look around" spatial images.

Man has sought for decades to reproduce scenes in stereoscopy without the use of viewing aids at the eyes of the observers and in a manner such that a number of persons might view such scenes at one time and without restriction as to their various individual positions.

I have found that by presenting a relatively large number of related images of the scene to be viewed behind a rapidly moving optically generated vertical aerial exit slit, the parallax thus occuring prevents one eye of each observer from seeing what the other eye sees at any and every instant of time. The aerial exit slit being in motion, each eye sees a complete image within a short interval of time. I make this interval within the persistence of vision for human observers. The brain fuses the two eye observations into a single stereoscopic view image, as my practical results predicate.

Considering my system in greater detail, the perspective that one eye of any observer sees is made up of discrete vertical lines of image information taken at discrete instants of time. At these same instants of time, the other eye of that observer sees a completely different perspective. The net perspective for the two eyes is different, of course, because the eyes are not coincident in space, but are spaced apart horizontally. Considering the image as an entity, it is disected in both time and space.

An object of my invention is to provide viewing of 3-dimensional television without the use of viewing aids at the eyes of the observers. Another object is to provide a stereoscopic system in which various perspectives of the scene viewed may be obtained by changing one's position around the stereoscopic television projector. Another object is to provide a basic stereoscopic television projector applicable to known and existing forms of image acquiring processes. Another object is to provide a means for reproducing stereoscopic television images that are relatively rugged and are suited to retain adjustment in practice. Other objects will become apparent upon reading the following detailed specification and upon examining the accompanying drawings, in which are set forth by way of illustration and example, certain embodiments of my invention.

DETAILED DESCRIPTION OF DRAWINGS

The television (TV) signal generated at the TV studio will contain two parallel channels within the same bandwidth of a single standard TV channel. Signals from two TV cameras (extreme left and right views) will be processed for bandwidth reduction similar to the CBS Inc. "STRAP" system (Simultaneous Transmission and Recovery of Alternating Pictures). In this system, only the odd or even fields are transmitted and the respective even or odd fields are synthesized at the receiver. U.S. Pat. No. 4,027,333 of May 31, 1977 entitled "Multiplex Color Television Transmission System" by Arthur Kaiser, covers this concept in detail. Additional alternate methods may also be employed. The two channels will be parallel processed within the element correlator of my invention to synthesize N "in-between" imaginary camera position channels so that the 3-D TV receiver/projector described in this specification, will integrate N+2 total TV frames in generating the composite 3-D views having horizontal parallax.

Figure 1:
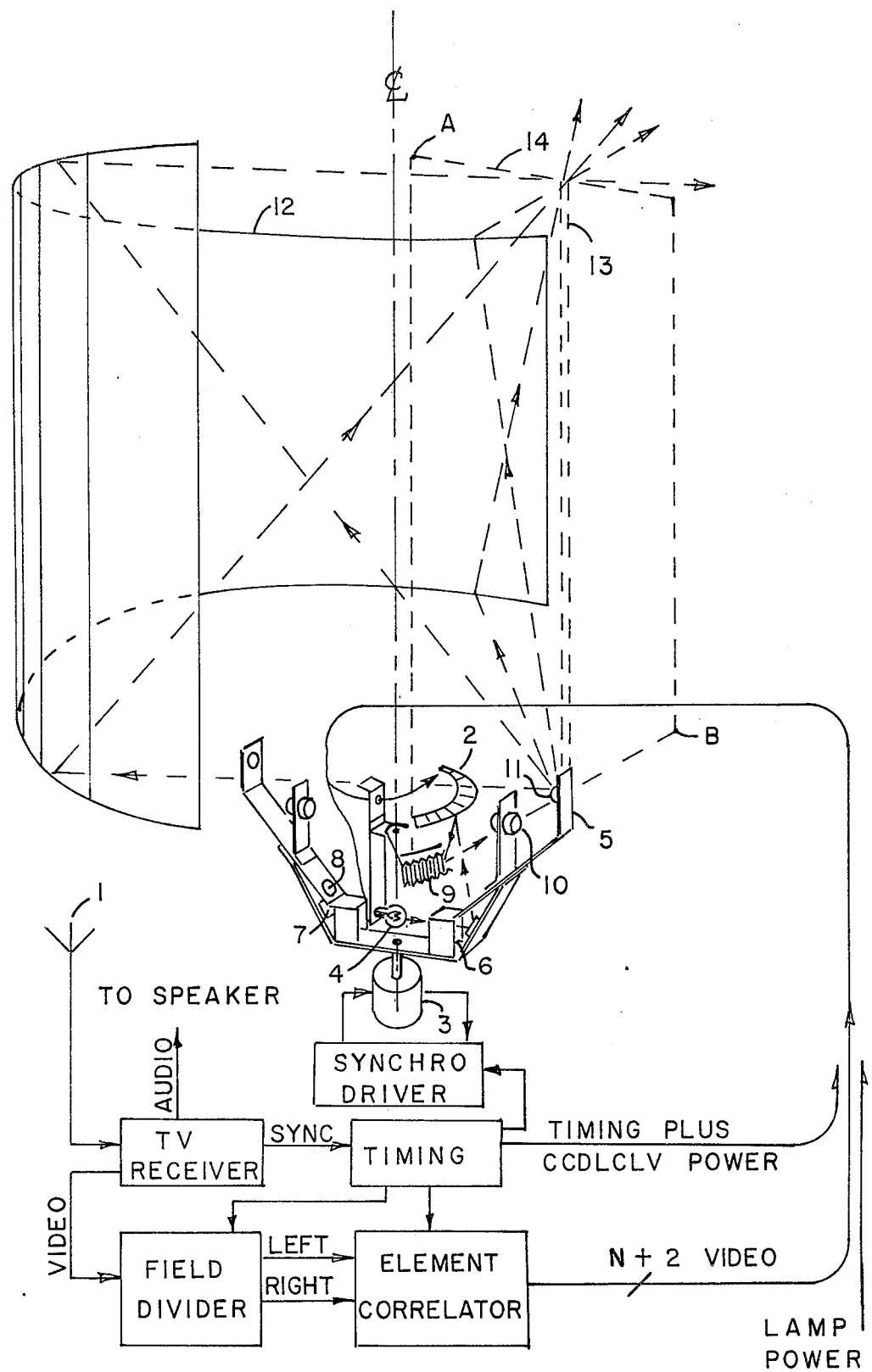
FIG. 1 shows a descriptive block diagram of an embodiment of my 3-D television receiver/projector.

FIG. 1 shows a perspective of one embodiment of my 3-D TV receiver/projector invention and introduces the main elements in the system. In FIG. 1, the television signal is received by conventional antenna 1 and sent to a TV receiver where the desired RF channel is selected and converted to audio, sync and video. An audio signal is derived for driving a conventional loud speaker. Horizontal and vertical sync signals are generated to control the timing for the individual Charge Couple Device Liquid Crystal Light Valve (CCDLCLV) TV frame modulators in the 120 degree arc radial array 2 (described in U.S. patent references to follow). TV field synchronization reference signals are supplied to motor 3 and timing reference is supplied for the Field Divider and Element Correlator. Video from the TV Receiver is sent to the Field Divider which separates the extreme left and right TV fields for processing by the Element Correlator. The mathematics for the processing algorithm of the Element Correlator (which calculates the video for each line of the TV frame for the "N" synthesized camera positions between the extreme left and right camera positions) is described in FIG. 2 and text. N+2 parallel video lines are input from the Element Correlator to the CCDLCLV TV frame light modulators. Patent application Ser. No. 107,838 of 12-28-79 showed that a practical value for N+2=24. Related timing and power for the stationary array of CCDLCLV's plus power for the stationary projection lamp 4 is carried by wire from the source to those stationary components. Scanner 5 is connected to synchronous motor 3 and rotates at 1800 rpm (30 r/s and in sync with the TV sync pulses). Scanner 5 is symmetrical about its rotation axis and contains condensing lens assembly 6, mirror 7, polarizer 8, a stationary conical array of "N+2" 90 degree roof mirrors 9 arranged in an arc under the 120 degree arc array of CCDLCLV's 2, an analyzer and projection lens assembly 10 and an aspherical reflector 11. Details of the scanner assembly constructed of items 2 through 11 is shown in my U.S. patent application Ser. No. 107,838. Light from lamp 4 is condensed by condenser lens assembly 6, reflects from a mirror similar to mirror 7 in symmetry (shown on the opposite side of the scanner) passes through a polarizer similar to 8, reflects from the CCDLCLV array 2 and then reflects from the array of N+2 roof mirrors 9 and passes through the assembly of analyzer and projection lens 10 and reflects from aspheric mirror 11 to the semi-specular and segmented screen 12 described in FIG. 3 and text and in more detail in my U.S. Pat. No. 4,231,642 issued 11-4-80. From screen 12, all of the projected light is gathered to a vertical aerial exit slit 13 which linearly moves across the imaginary viewing window 14 in 1/60 second (i.e. equal to a TV field period) as scanner 5 makes one-half revolution in 1/60 second. Window 14 has diagonal corners identified by points A and B in FIG. 1. The aerial exit slit 13 occupies the entire height of window 14 where the window height is determined by the vertical scatter angle of screen 12.

My 3-D television receiver/projector system may be made to work properly with a picture modulator array of frames having the feature of light transmission as well as the reflection method described in this specification.

Figure 2:
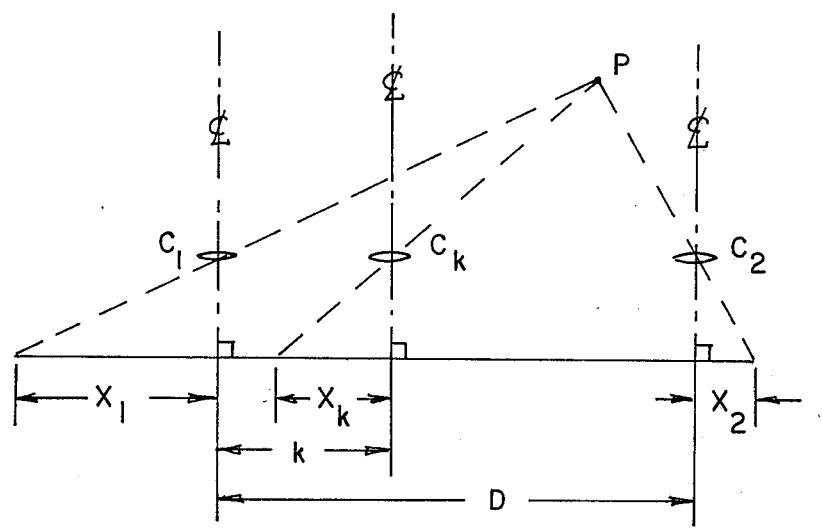
FIG. 2 shows a simplified plan view of the photographing geometry utilized to photograph scenes for display on the embodiment shown in FIG. 1.

In FIG. 2, $C_1$ and $C_2$ represent the two synchronized studio cameras having parallel optical axes and aligned such that any given scan line for both $C_1$ and $C_2$ lies in a common plane for that scan line. Camera $C_k$ is an imaginary camera whose view is synthesized from the views acquired by $C_1$ and $C_2$. The problem here is to develop a mathematical formula for determining the proper element position for arbitrary scene point P for imaginary camera $C_k$. The following definitions are given for nomenclature in FIG. 2:

P = point in scene
D = separation between $C_1$ and $C_2$ (studio cameras)
$C_1$ = origin reference point = real TV camera (left)
k = distance from origin to arbitrary imaginary camera $C_k$
$C_2$ = real TV camera (right)
$C_k$ = imaginary TV camera (arbitrary)
$X_1$ = element distance for image of P in camera $C_1$ measured from the center of camera's image
$X_2$ = same for camera $C_2$
$X_k$ = same for camera $C_k$ It can be proven mathematically, that the relationship of the above parameters in FIG. 2 can be expressed by the following formula:

$$X_k = X_1(1-k/D) + X_2 k/D$$

k/D is a known value and is different for each of the "N" in-between imaginary camera positions. A simple calculation is required in the "Element Correlator" (of FIG. 1) to determine $X_k$ when $X_1$ and $X_2$ are known. $X_2$ is developed from matching reference elements at $X_1$ using hue, intensity and run-length encoding. Run-length encoding involves the number of adjacent elements on a given scan line at $C_1$ that have common characteristics of hue and intensity. The algorithm used in matching the scan line at $C_2$ to the identical line at $C_1$ would look for a sector of the line having similar common characteristics of hue and intensity to those found at $C_1$ in determining several adjacent synthesized elements along the same common scan line for $C_k$.

Figure 3:
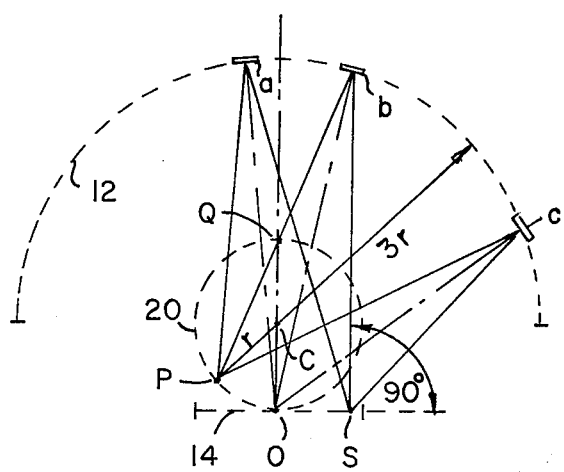
FIG. 3 shows a simplified plan view of the optical geometry of the 3-D television receiver/projector optical scanner and screen according to my invention.

My invention uses "precession" of the N+2 images as described in my previous U.S. Pat. No. 4,231,642 and patent application Ser. No. 107,838. This relationship is shown in FIG. 3 (a plan view of the basic geometry of the projection system). The scan projector P moves in locus 20 at radius r. At radius 3r the segmented horizontally reflecting screen 12 with vertical scatter property is shown. Screen 12 is described in detail in my U.S. Pat. No. 4,231,642. Only three of the several screen segments are shown in FIG. 3 at locations a,b and c. Each of these segments is normal to a line drawn to 0 on aerial slit scan line 14. Precession is such that the original camera's optical axis is projected along PQ independent of the position of P along the scan circle 20. Line PQb reflects to aerial exit slit S in a line bS which is normal to scan line 14. The precession of the 24 images in CCDLCLV array 2 with respect to the arc of 24 roof mirrors 9 of FIG. 1, will cause the geometry of FIG. 3 to automatically occur during each scan cycle.

Lens correction for projection onto deeply curved concaved screens is described in detail in U.S. Pat. No. 3,292,491, titled "Picture Projection Systems" that issued 12-20-66 to J. Hourdiaus.

My U.S. patent application Ser. No. 107,838 describes the geometry for screen vertical segments shown in FIG. 3 at a,b and c. Calculations showed that a minimum of 226 screen elements are required having a maximum width of 0.35 inches and can be made from horizontally brushed stainless steel.

The description of optical scanning of adjacent picture frames and how they interleave to form the resultant stereoscopic scene is discussed in detail in my U.S. Pat. No. 4,089,597. Electronic scanning of pictures can produce unwanted net effects to the eye if not handled properly. Frames of film present all picture elements in parallel at the time of scan but television pictures occur on an element by element basis. The reason for selecting the CCDLCLV as the modulation media for my 3-D TV invention is that it has the property to store up a field and then parallel transfer the whole field so that decay is the same all over the picture. In my 3-D TV invention, picture viewing during scan and decay could bring unwanted (or "aliasing") effects to the viewer because what he sees is related to what is on the screen during the optical scanner interrupt period. Since the scan rate is one revolution in 1/30 sec., 120 degrees (i.e. the 24 picture array arc) is scanned in 1/90 second. This corresponds to scanning one frame in 1/2160 seconds or 463 microseconds. Since the horizontal line sweep period is 63.5 microseconds, only about 7 lines could be electronically scanned in a conventional TV projector while the optical scanner traversed the single frame on the 24 frame array. To circumvent the problems of non-uniform picture decay and partial scanning, I take the approach (in my invention) of complete field store and subsequent parallel transfer of the image to the display array. This of course requires that the optical scanner be timed to the TV sync signal. A synchronous motor is selected over a DC servomotor because of its quiet operation.

Any number of scanning facets can be adapted to my invention but the time interval occuring between successive scans of a television field should be 1/60 second. One facet would require a rotor scan speed of 3600 rpm whereas 2 facets would have a rotor scan speed of 1800 rpm. As the facets increase in quantity the rotor can speed decreases but the complexity and cost of construction increases. A practical compromise for a home TV system would be 2 facets.

Figure 4:
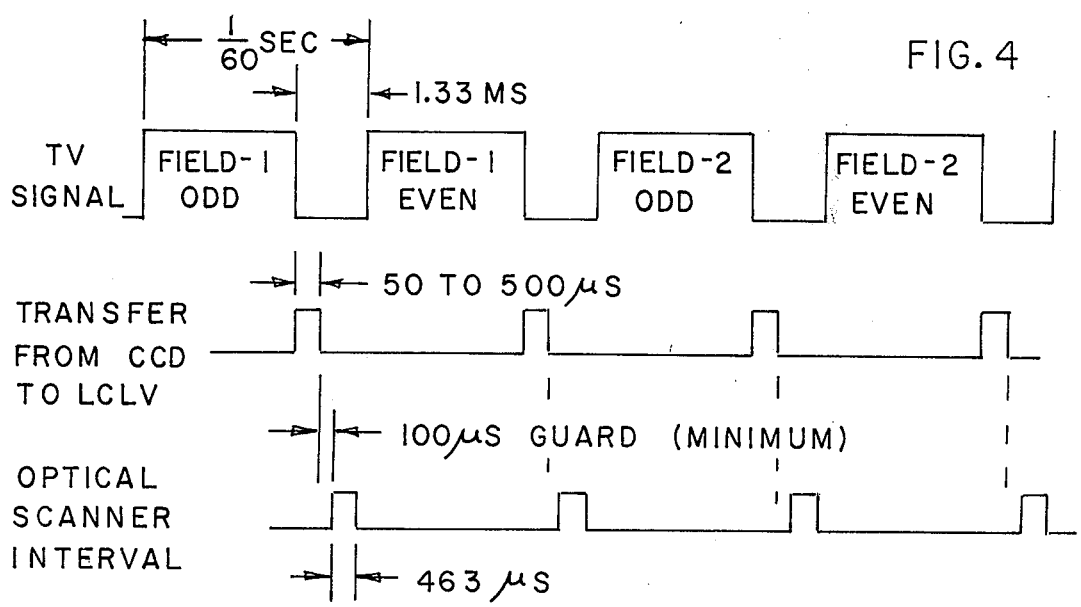
FIG. 4 shows timing waveforms for one of N+2 images in the array according to my invention.

U.S. Commercial television uses 21 horizontal lines during vertical blank=1334 microseconds. The optical scanner scan period of 463 microseconds/field fits into this natural blank period very well. FIG. 4 shows the timing waveforms for the TV video signal for any single one of the N+2 modulating frames. Timing signals to the N+2 Charge Couple Device (CCD) frames assure that each sequential video field in the N+2 series of pictures being optically scanned is clocked into the Liquid Crystal Light Valve (LCLV) such that an entire video field of any one of the N+2 video fields enters its respective LCLV within 100 microseconds before the scanner arrives. Since all N+2 video fields are available in parallel at the N+2 CCD storage, there is no problem to sequentially release them over the 11.1 millisecond scan interval (1/90 second period to scan 120 degrees of a 1/30 second period) of N+2 video fields and to then commence the sequential loading of the next field in the TV frame.

The optical scanner could scan the LCLV any time between the completed CCD transfer until the next transfer occurs, but should be as close to the transfer time as possible to assure a high contrast picture. The liquid crystal natural decay time constant will gradually fade the entire picture (as a unit).

When an observer moves laterally with respect to the spatial images in the 3-D TV receiver/projector according to my invention, he will "see around" the images as he would around the real objects in a real scene (similar to a Hologram having horizontal parallax only).

A description of the CCDLCLV was patented by Dr. Jan Grinberg along with co-inventors Mike Waldner and Joe Jenny. Their U.S. Pat. No. is 4,227,201 which issued Oct. 7, 1980 entitled "CCD Readout Structure For Display Applications". The CCDLCLV device can be split into two fundamental systems- the CCD portion and the LCLV portion. In the CCD portion, a serial television signal is converted into a parallel image array surface consisting of charges on the image array proportional to the television scene within the frame at that time. Paul K. Weimer has a U.S. Pat. No. 3,763,480 titled "Digital and Analog Data Handling Devices"- issued 10-2-73 and another U.S. Pat. No. 3,866,209 titled "Charge-Transfer Display System"- issued 2-11-75.

These patents describe a means to achieve the above image array surface charges which are available for coupling into a LCLV. A basic CCD U.S. Pat. No. 3,654,499 was issued to George E. Smith on 4-4-72 and is entitled "Charge Coupled Memory with Storage Sites". The LCLV portion of the television readout device is described by Terry D. Beard in U.S. Pat. No. 3,824,002 titled "Alternating Current Liquid Crystal Light Valve" issued 7-16-74 and in another U.S. Pat. No. 4,019,807 titled "Reflective Liquid Crystal Light Valve with Hybrid Field Effect Mode" issued 4-26-77 to Donald D. Boswell. The photoconductor and external illuminated image input described in the LCLV patents are replaced by the CCD array.

Color may be added to a liquid crystal display matrix array as described in U.S. Pat. No. 4,006,968 titled "Liquid Crystal Dot Color Display" issued 2-8-77 to Michael N. Ernstoff.

My 3-D TV invention will also operate properly if the controlling light modulator picture surface does not allow decay but holds either an entire field or frame on display from a single scene perspective during the optical scan period. Such a device is the TITUS optical relay for television projection described in U.S. Pat. No. 3,520,589 titled, "Optical Relay for Television Purposes" by Yves Angel and Gerard Marie which issued 7-14-70. The use of this device in my invention would not be cost effective and would considerably increase the volume, weight and power compared with the CCDLCLV.

There are other solid state and tube type imaging surfaces which might be used to produce image array modulated light using either reflective or transmissive means. Liquid crystal material is sighted in this specification as one of those means.

Having thus fully described my invention and the manner in which it is to be practiced, I claim:

1. A method of stereoscopically reproducing television signals for observation by a plurality of observers without a need for visual aids at said observers eyes, comprising the following steps:

acquiring two views of a scene; synthesizing N views at a receiver between said two views;

placing N+2 frames or fields on an array of N+2 images;

scanning said image array by a scan projector having one or more identical facets;

causing any image of said image array to store a whole television field or frame during a scan interval by any single facet of said scan projector;

causing all images in said image array to advance to a next sequential television field or frame during a period between scans by adjacent facets of said scan projector;

projecting sequentially said images of said array onto a semispecular screen, said scan projector being positioned during projection at successive positions about an arc of a projection circle, said screen being of larger radius compared with said projection circle;

causing said screen to vertically scatter and horizontally reflect incident light from said scan projector;

causing said reflected incident light from said screen to intersect on a line essentially tangent to said projection circle;

causing said intersected light to move along said line;

causing said scan projector interval between scans by adjacent facets to be within the period of persistence of vision of said observers.

2. A construction for displaying stereoscopic television to observers situated in front of the viewing screen of said construction, said construction including:

a television antenna to receive a left and right television camera view; a receiver to generate video for division into left and right television camera picture fields by means of a field divider, sync for said field divider, sync for timing a synchronous motor connected to a scan projector, sync for an element correlator and for an image array, said element correlator to synthesize N camera views between said left and right camera views; a fixed lamp to illuminate said image array sequentially through optics mounted on each facet of said scan projector, a light polarizer and analyzer on either side of said image array, said analyzer to sense the change in picture element polarization within said image array; an array of roof mirrors to reflect said array images through projection optics, said projection optics mounted on said scan projector; a stationary concaved semi-specular viewing screen to receive said projected images and return the incident projected light to a transversely moving aerial exit slit.

3. A method of stereoscopically reproducing television signals comprising the steps of:

acquiring two views of the scene;

synthesizing at the receiver N views between said two views;

placing N+2 frames or fields on an array of N+2 images;

scanning said image array by a scan projector having one or more identical facets;

causing any image of said array of images to store a whole television field or frame during the scan interval by any single facet of said scan projector;

causing all images in said image array to advance to the next sequential television field or frame during the period between scans by adjacent facets of said scan projector;

sequentially projecting said array of images onto a semi-specular screen;

positioning said scan projector during projection at successive positions about the arc of a projection circle; said screen being of larger radius compared with said projection circle; causing said screen to vertically scatter and horizontally reflect incident light from said scan projector;

causing said reflected light from said screen to intersect on a line essentially tangent to said projection circle; causing said intersected light to move along said line;

and causing said scan projector interval between scans by adajcent facets to be within the period of persistence of vision of observers.

4. An apparatus for displaying stereoscopic television to observers situated in front of a television viewing screen, said apparatus including:

a television antenna to receive a left and right television camera view; a receiver to separate said left and right camera view fields by means of a field divider; sync for timing said field divider; sync for timing a synchronous motor connected to said scan projector, means to receive a synchronous signal for an element correlator and for an image array; said element correlator being adapted to synthesize N camera views between said left and right camera views; a fixed lamp to illuminate said image array sequentially through optics mounted on each facet of said scan projector; means to sense the change in picture element characteristic within said image array; means to direct said images from said image array through projection optics, said projection optics being mounted on said scan projector; a stationary semi-specular viewing screen to receive said projected images and return the incident projected light to a transversely moving aerial exit slit.

5. The apparatus of claim 4, wherein said means to direct said image array through projection optics comprises an array of roof mirrors.

6. The apparatus of claim 4, wherein said viewing screen is concave.

7. The apparatus of claim 4, wherein said means to sense any change in picture element characteristic comprises a light polarizer and analyzer.

* * * * *